United States Patent [19]
Ogawa

[11] Patent Number: 5,159,557
[45] Date of Patent: Oct. 27, 1992

[54] DISTANCE DETECTING APPARATUS AND METHOD FOR A VEHICLE

[75] Inventor: Kenji Ogawa, Himeji, Japan

[73] Assignee: Mitsubishi Denki Kabushiki Kaisha, Tokyo, Japan

[21] Appl. No.: 713,204

[22] Filed: Jun. 11, 1991

[30] Foreign Application Priority Data

Jun. 13, 1990 [JP] Japan .................. 2-154406

[51] Int. Cl.$^5$ .............. G01C 3/00; G06F 15/50
[52] U.S. Cl. .................. 364/460; 364/461; 364/561; 358/103; 180/169
[58] Field of Search ............ 364/443, 444, 460, 461, 364/561, 424.02, 426.04; 358/103; 318/587; 180/167, 168, 169; 340/937

[56] References Cited

U.S. PATENT DOCUMENTS

| | | | |
|---|---|---|---|
| 4,757,450 | 7/1988 | Etoh | 364/461 |
| 4,819,169 | 4/1989 | Saitoh et al. | 358/103 |
| 4,858,132 | 8/1989 | Holmquist | 364/424.02 |
| 4,931,937 | 6/1990 | Kakinami et al. | 364/460 |
| 4,970,653 | 11/1990 | Kenue | 364/424.02 |
| 4,987,357 | 1/1991 | Masaki | 318/587 |
| 5,036,474 | 7/1991 | Bhanu et al. | 364/424.02 |
| 5,081,585 | 1/1992 | Kurami et al. | 318/587 |

FOREIGN PATENT DOCUMENTS

| | | |
|---|---|---|
| 2611053 | 2/1988 | France . |
| 116386 | 9/1981 | Japan . |
| 196412 | 11/1983 | Japan . |
| 182613 | 8/1987 | Japan . |

*Primary Examiner*—Gary Chin
*Attorney, Agent, or Firm*—Sughrue, Mion, Zinn, Macpeak and Seas

[57] ABSTRACT

A distance detecting apparatus and method for a vehicle are disclosed which are suitable for use in making a vehicle to automatically follow a preceding vehicle, and which can not only perform accurate detection of the distance to an object in the form of a preceding vehicle, and but also accurately follow a target image with a rather simple window setting operation. An object such as a preceding vehicle is imaged by an image-sensing means at two different points to generate first and second image signals representative of the object. A specific window for one of the first and second image signals is formed on a screen of a display. A comparison is made between the first and second image signals in the specific window so as to measure the perpendicular distance from the two points to the object. The image signals are successively sampled at a predetermined time interval and compared with the last sampled image signals in the window to find the most similar ones. A provisional window is set up based on the most similar image signals thus found. In one form of the invention, the provisional window is successively shifted little by little so as to find the best position for providing the best symmetry of the image signals therein, and then a new window is set, as reference image signals, at the best position of the provisional window. In another form, the axis of symmetry of the image signals within the provisional window is determined, and a new window is set, as reference image signals, which has a prescribed center line positioned at the location of the axis of symmetry of the image signals therein.

8 Claims, 9 Drawing Sheets

LEFT-HAND IMAGE

RIGHT-HAND IMAGE

DISTANCE DETECTING APPARATUS AND METHOD FOR A VEHICLE

BACKGROUND OF THE INVENTION

The present invention relates to a distance detecting apparatus and method for a vehicle which successively measures the distance from a vehicle to a preceding vehicle running ahead thereof.

Some typical examples of such a distance detecting apparatus are disclosed in Japanese Patent Publication Nos. 63-38085 and 63-46363. The apparatuses disclosed therein commonly have a pair of first and second parallel optical systems having two convex lenses 101, 102 disposed in a horizontally aligned relation at a prescribed distance B away from each other, as shown in FIG. 7. A pair of separate image sensors 103, 104 are horizontally disposed at focal points of the lenses 101, 102 spaced a focal distance f from the locations of corresponding lenses 101, 102, respectively, for generating respective image signals representative of an object 105 such as a vehicle. A pair of A/D converters 106, 107 receive the image signals from the corresponding image sensors 103, 104 and convert them into digital signals which are then stored in a pair of corresponding memories 108, 109. A common microprocessor 110 takes out the digitized image signals stored in the memories 108, 109 and processes them for the purpose of calculating the prependicular distance L between the object 105 and the lenses 101, 102.

Specifically, the microprocessor 110 successively shifts the image signals read out from the image sensors 103, 104 and electrically superposes them one over the other, so that the distance L from the lenses 101, 102 to the object 105 is calculated based on the principle of triangulation using the following formula:

$$L = (f \times B)/(a \times P)$$

where a is a shift distance by which the image signals are moved to obtain the best match, and P is the pitch between picture elements in the image sensors 103, 104.

On the other hand, a typical method of following a preceding vehicle as captured by an image sensor or the like is disclosed in Japanese Patent Publication No. 60-33352. In this method, for the purpose of following a target on a display screen, an operator has to set a following gate or window on the display screen which encloses the target to be followed, while looking at the screen. In this case, most image signals of the background, which are noise in following the target image, are excluded from the window.

Using the distance detecting apparatus as described above, which successively detects the distance from a vehicle to a preceding vehicle, in combination with the above-described image following method, which continuously follows a specific target imgage, it is almost practically impossible for the driver to set a rather complicated following window or gate on a screen while driving the vehicle, as described in Japanese Patent Publication No. 60-33352. This poses a problem particularly from the safety point of view. In this connection, even if a rather simple window is employed for expediting and simplifying the driver's window setting operation, background images degrade the S/N ratio, thus making it difficult to follow the target image.

SUMMARY OF THE INVENTION

Accordingly, the present invention is intended to overcome the above-described problems encountered with the known distance detecting apparatuses.

An object of the invention is to provide a novel and improved distance detecting apparatus and method for a vehicle which is suitable for use in making a vehicle automatically follow a preceding vehicle, and which can not only perform accurate detection of the distance to an object in the form of a preceding vehicle, and but can also accurately follow a target image with a rather simple window setting operation.

In order to achieve the above object, according to the present invention, an object such as a preceding vehicle is imaged by an image-sensing means at two different points to generate first and second image signals representative of the object. A specific window for one of the first and second image signals is formed on a screen of a display. A comparison is made between the first and second image signals in the specific window so as to measure the perpendicular distance from the two points to the object. The image signals are successively sampled at a predetermined time interval and compared with the last sampled image signals in the window to find the ones that most resemble each other. A provisional window is set up based on the most similar image signals thus found.

In one form of the invention, the provisional window is successively shifted little by little so as to find the best position thereof which provides the best symmetry of the image signals therein, and then a new window is set, as reference image signals, at the best position of the provisional window.

In another form, the axis of symmetry of the image signals within the provisional window is determined, and a new window is set, as reference image signals, which has a prescribed center line positioned at the location of the axis of symmetry of image signals therein.

The above and other objects, features and advantages of the present invention will become more readily apparent from the following detailed description of a few preferred embodiments of the invention taken in conjunction with the accompanying drawings.

DESCRIPTION OF THE PREFERRED EMBODIMENTS

A few embodiments of the present invention will now be described in detail with reference to the accompanying drawings.

Figure 1:
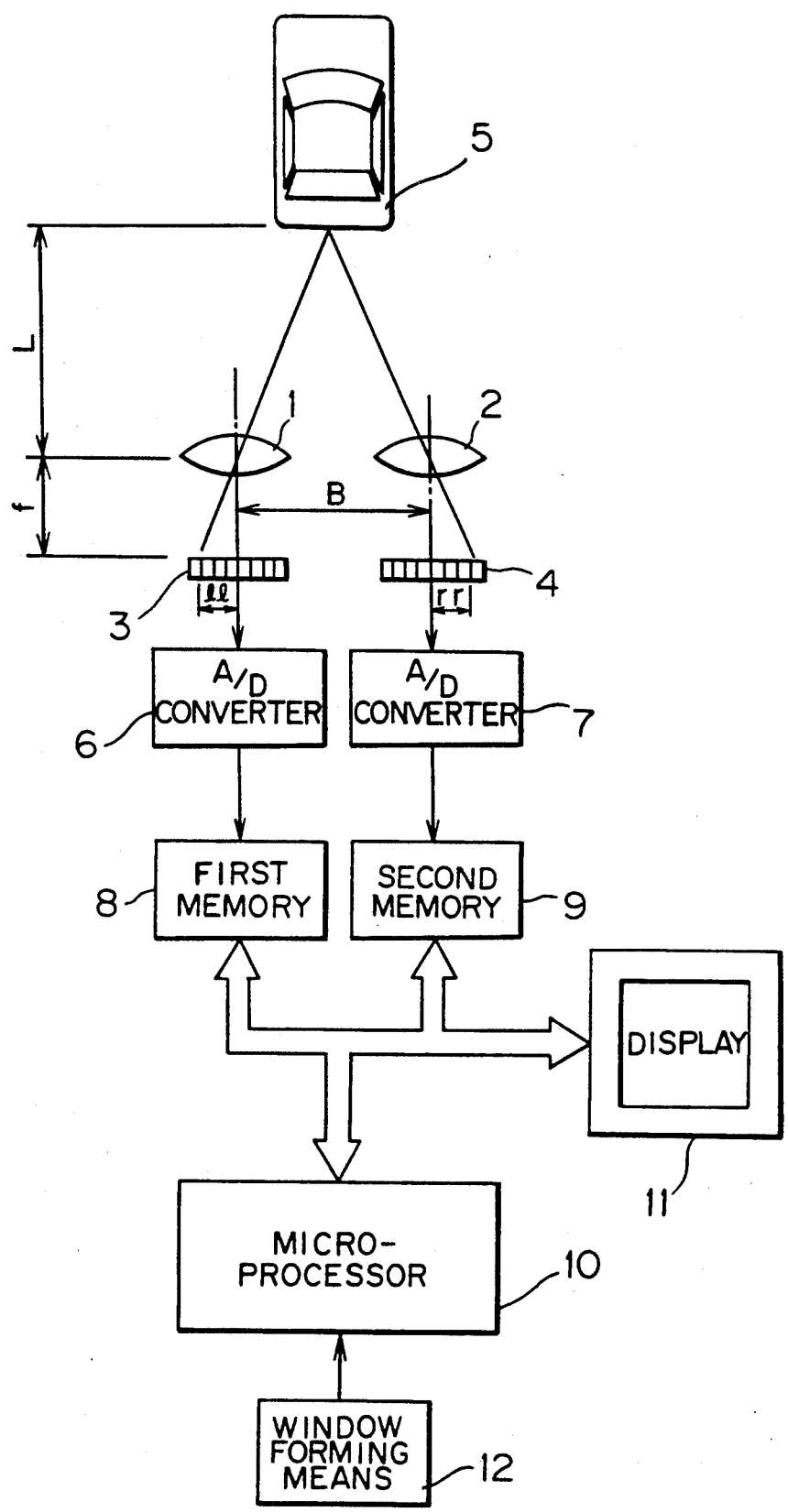
FIG. 1 is a block diagram of a distance detecting apparatus for a vehicle in accordance with the present invention.
Figure 2A:
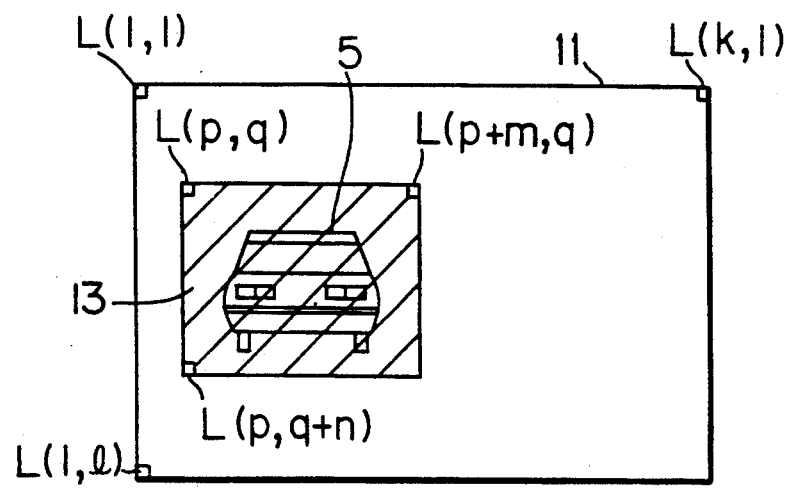
FIG. 2(a) is an explanatory view showing that an image following window enclosing a left-hand image of an object in the form of a preceding vehicle caught by a first or left-hand image sensor is set on a screen in the apparatus of FIG. 1.
Figure 2B:
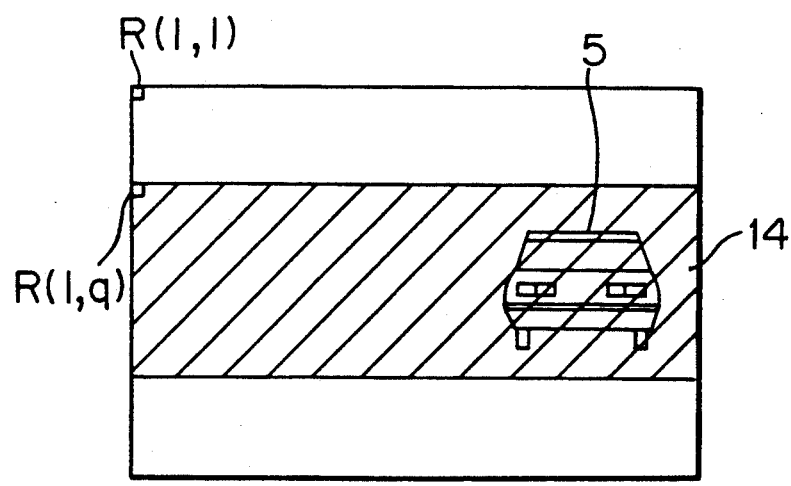
FIG. 2(b) is an explanatory view showing that a right-hand image of the object caught by a second or right-hand image sensor is displayed on the screen in the apparatus of FIG. 1.

FIG. 1 illustrates the schematic construction of a distance detecting apparatus for a vehicle which is suitable for use with a vehicle following apparatus for enabling a vehicle to follow a preceding vehicle. The apparatus illustrated includes a pair of first and second parallel optical systems having two convex lenses 1, 2 disposed in a horizontally aligned relation at a prescribed distance B away from each other, and a pair of separate first and seconde (i.e., left-hand and right-hand) image sensors 3, 4 which are horizontally disposed at focal points of the lenses 1, 2 at a distance f from the locations of the corresponding lenses 1, 2, respectively, for generating first and second image signals each in the form of an analog signal representative of a two-dimensional image, which are input to a pair of corresponding analog to digital (A/D) converters 6, 7. The outputs of the A/D converters 6, 7 are input to a pair of corresponding first and second memories 8, 9 and stored therein. A microprocessor 10 performs data transfer with the memories 8, 9 as well as various calculations and determinations based on the data stored in the memories 8, 9. A displayed 11 having a screen is connected to the first and second memories 8, 9 and the microprocessor 10 for displaying an image formed by the first or second image sensor 8, 9 on the screen. The operation of the display 11 is controlled by the microprocessor 10. A window forming means 12 is connected to the microprocessor 10 so that the driver of a vehicle can manipulate the window forming means 12 to form image following specific window on the screen of the display 11 while looking at the screen. Though not illustrated, the microprocessor 10 includes a distance measuring means for making a comparison between the first and second image signals in the window so as to measure the perpendicular distance from the optical systems 1, 2 to the object 5, a provisional window setting means which successively samples image signals at a predetermined time interval, makes a comparison between image signals in the window at two successive points in time, detects the most similar of the image signals between the two time points, and sets up a provisional window based on the most similar image signals, a symmetry evaluating means for evaluating the symmetry of image signals within the provisional window by shifting the provisional window little by little so as to find the best position thereof which provides the best symmetry of the image signals therein, and a reference image setting means for setting, as reference image signals, a new window at the best position of the provisional window. The microprocessor 10 further includes a means for calculating the direction and quantity of movement of the object on the basis of a change between two successively set reference image signals. The operations of the above-mentioned various means of the microprocessor 10 may be performed by software in the form of a control program executed by the microprocessor 10.

Figure 3A:
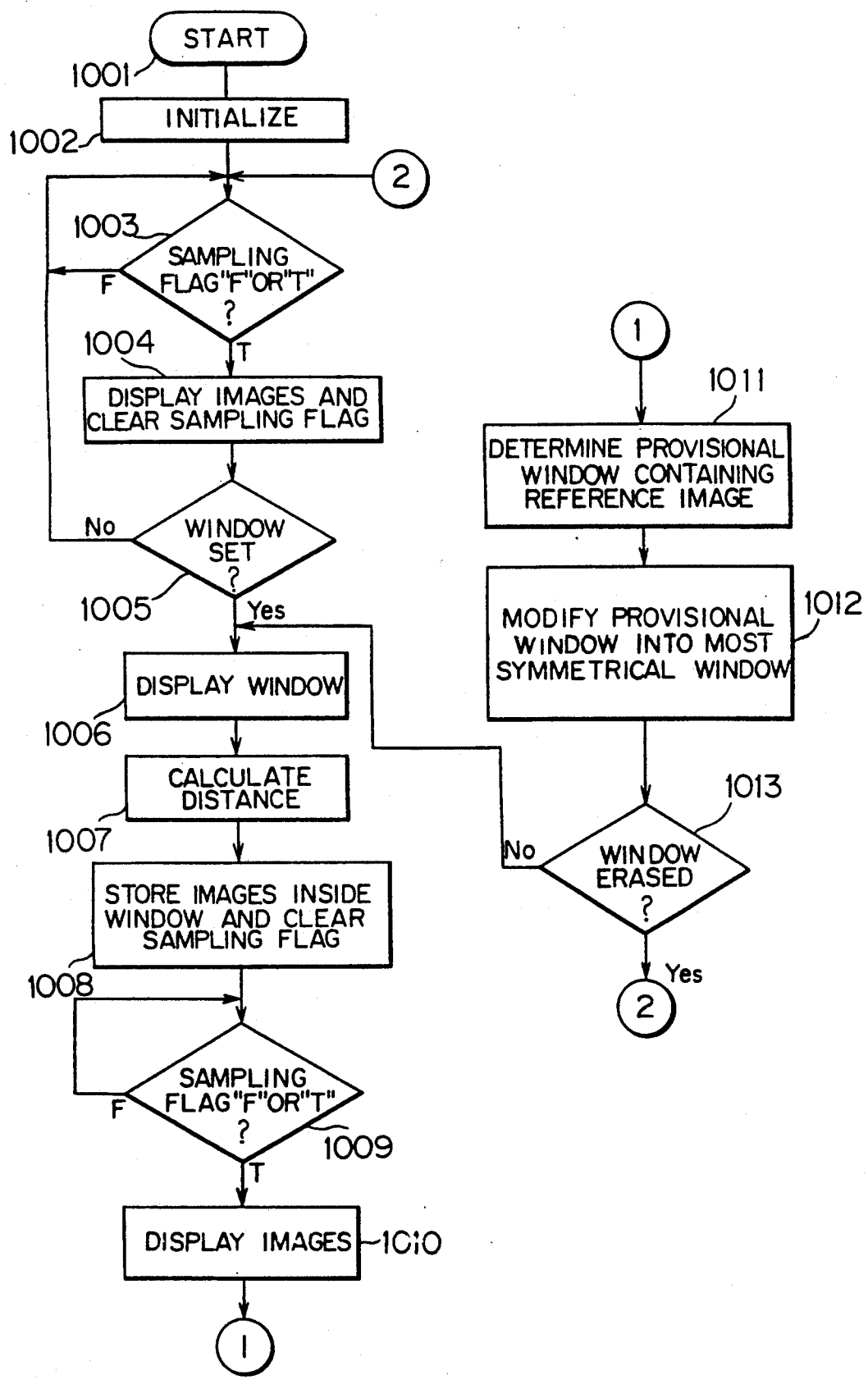
FIGS. 3(a) and 3(b) are flow charts showing the operation of the apparatus of FIG. 1 in accordance with a first embodiment of the invention, FIGS. 3(a) and 3(b) being a main routine and a timer-interrupted sub routine, respectively, executed by a microprocessor of FIG. 1.

The operation of the above-described apparatus will now be described with particular reference to FIGS. 2(a) and 2(b) and FIGS. 3(a) and 3(b). In FIG. 3(a) which illustrates a main routine executed by the microprocesor 10, in Step 1001, a program executed by the microprocessor 10 is started. Then in Step 1002, the microprocessor 10 is initialized. In step 1003, a sampling flag is repeatedly checked until it becomes "true (T)". In this regard, the sampling flag is changed into "true (T)" by a timer-operated interrupt routine of FIG. 3(b), and the "true" flag means that new images are read or taken in the memories 8, 9.

Figure 3B:
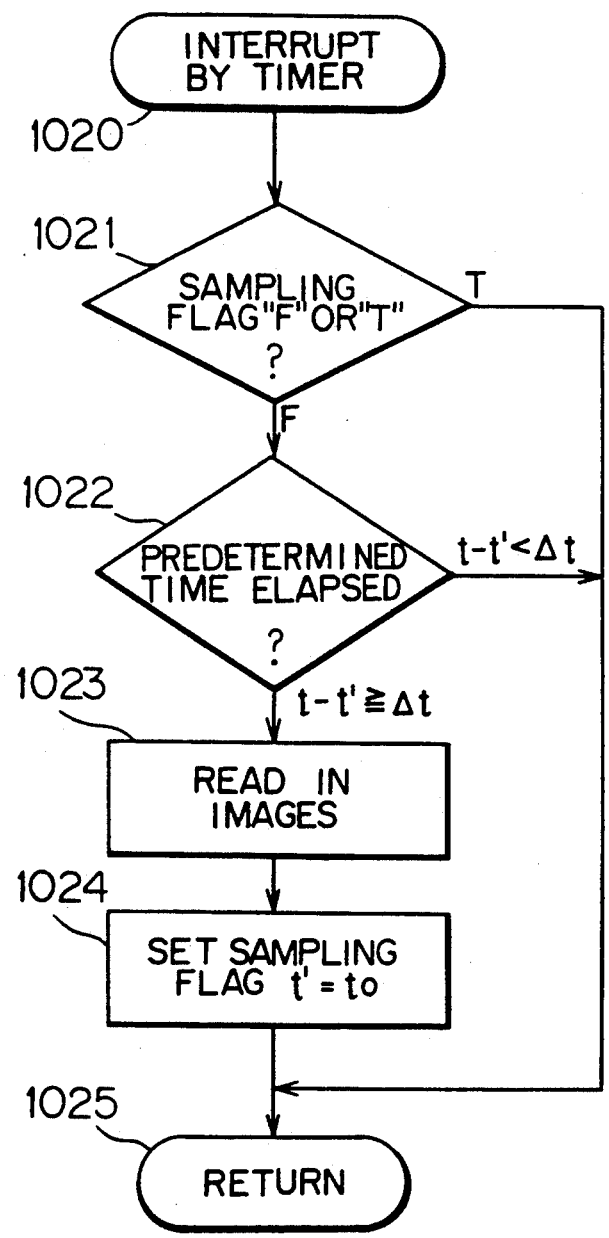

The timer-operated interrupt routine is executed at a predetermined interval in the following manner. First in Step 1021, a sampling flag is checked for "true (T)" or "false (F)". If the sampling flag is "true", the processing of the main routine is not still performed, so the program returns to the main routine through Step 1025. If in Step 1021 the sampling flag is determined to be "false (F)", then in Step 1022, a timer is checked as follows. First, the difference between the time of present interrupting "t", at which the timer-operated interrupt routine of FIG. 3(b) is started, and the time of last interrupting "t'" previously stored, is calculated, and then the time difference (t−t') thus obtained is compared with a predetermined time duration Δt. If the time difference (t−t') is less than the predetermined time duration Δt, it is determined that it is not still a sampling time to take or read new images from the image sensors 3, 4 into the memories 8, 9, and the program skips to Step 1025 where a return is performed. If not (i.e., (t−t')≧Δt)), however, it is now determined to be a sampling time, and in Step 1023, the images caught by the image sensors 3, 4 are read in the corresponding memories 8, 9 through the A/D converters 6, 7, so that they replace or update the contents in the memories. Thereafter, in Step 1024, the sampling flag is changed into the "true (T)" state to inform the main routine of the updating of the memories 8, 9, and the time of present interrupting "t" is recorded as "t'". Then in Step 1025, the main routine is returned to.

On the other hand, in the main routine of FIG. 3(a), when the memories 8, 9 are updated, in Step 1004 the microprocessor 10 displays the images captured by the first or second image sensor 3, 4, e.g., those stored in the first memory 8, on the screen of the display 11, and changes the sampling flag into the "false (F)" state. In Step 1005, looking at the screen of the display 11, the driver manipulates the window forming means 12 so as to form a window 13 enclosing the image of an object 5 in the form of a preceding vehicle. In this regard, if a proper window 13 is not formed, the program returns to Step 1003, and Steps 1003 and 1004 are repeated until a proper window 13 is formed. Once the proper window 13 has been formed, then in Step 1006, the thus formed window 13 is displayed on the screen of the display 11, superposing on or enclosing some images displayed on the screen. At the same time, the microprocessor 10 determines which area in the first memory 8 storing the images caught by the first image sensor 3 corresponds to the image of the object 5 which is a reference image. In Step 1007, the microprocessor 10 calculates the distance to the object 5. For this calculation, as shown in FIG. 2, an area 14 in the second memory 9 sensed by the second image sensor 4 is scanned so as to find a location which provides the best match with the reference image enclosed by the window 13. For example, assuming that picture elements in the left-hand and right-hand images stored in the first and second memories 8, 9 are represented by L(i, j), R(i, j), respectively; the size of each of the left-hand and right-hand image areas is k×l; the size of the left-hand window 13 is m×n; and the position of the left-hand window 13 is represented by the position of an upper left picture element of R (p, q); the upper left position of the right-hand image area 14 is represented by R (i, q); and the position of scanning (S) for the right-hand image area 14 is represented by (s+i, q+j), a total sum P(S) of the differences between the left-hand picture element L(i, j) and the right-hand picture element R(i, j) is expressed as follows:

$$P(S) = \sum_{i=1}^{m} \sum_{j=1}^{n} |L(p + i, q + j) - R(s + i, q + j)| \quad (1)$$

Here, using equation (1) above, the total sum P(S) is calculated by changing the value of s from O to (k−m) so as to determine the position of scanning $S_{ms}$ which gives a minimum value of P(S). That is, this scanning position Sms represents the position of a right-hand image most matching the reference image. In this regard, the value of ms corresponds to a length of rr in FIG. 1, and the minimum value of P(S) corresponds to a length of ll in FIG. 1. Accordingly, the perpendicular distance L from the lenses 1 and 2 to the object 5 as displayed in the window 13 is calculated as follows:

$$L = (f \times B)/\{(ms - p) \times P\}$$

where B is the length or distance between the first and second lenses 1, 2; f is the focal distance of the lenses 1, 2; and P is the pitch or distance between adjacent picture elements of the image sensors 3, 4. In this case, since ms>P, it is better to scan from a position of (s=P) to a position of (k−m).

Figure 4A:
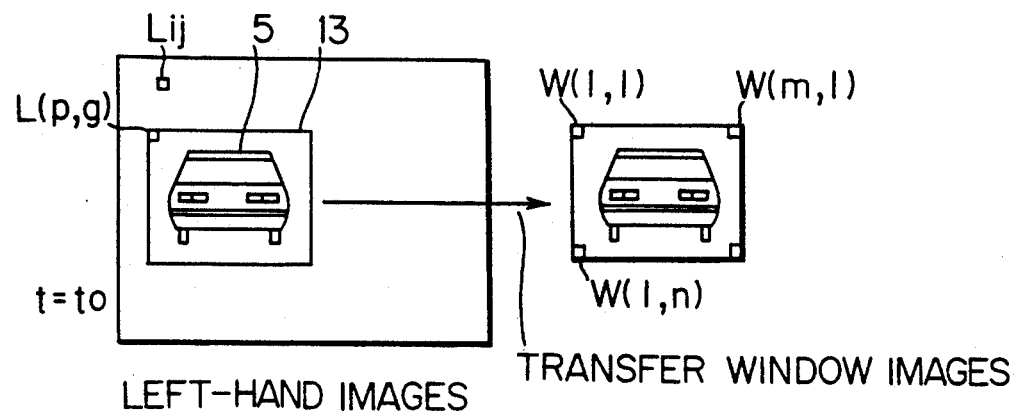
FIG. 4(a) is an explanatory view showing that a left-hand image of an object caught by the first or left-hand image sensor and enclosed in a first set window are transferred into a memory.

Next, the image following operation of this embodiment will be described in detail while referring to FIGS. 4(a)−4(c). First, when a first or left-hand window 13 is set at time t₀, in Step 1008, a memory area in the first memory 8 defined by the window 13 is transferred to and stored in a memory area for another window 15 which may be a memory area of the first or second memory 8, 9 or another unillustrated memory in the microprocessor 10. Subsequently at time t₁ at which a time of Δt has elapsed from time t₀, images captured by the image sensors 3, 4 at that time are sampled and stored. In Step 1009, the sampling flag is checked. If the sampling flag is "T" (true), then in Step 1011 images are displayed on the screen of the display 11. Specifically, in Step 1011, the microprocessor 10 scans the first memory 8 so as to detect a position of scanning most matching the image which is defined in the window 13. For this detection, for example, a total sum of the differences between picture elements W (i, j) of an image stored as the window 13 and picture elements L (i, j) in the memory 8 is calculated using the following equation:

$$Q(s, u) = \sum_{i=1}^{m} \sum_{j=1}^{n} |W(i, j) - L(s + i, u + j)| \quad (2)$$

Figure 4B:
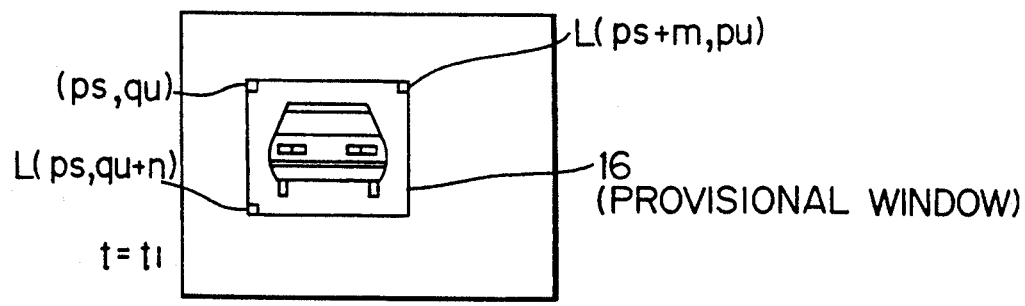
FIG. 4(b) is an explanatory view showing that a provisional window containing the image of the object read out from the memory is defined and displayed on the screen.

Here, as shown in FIG. 4(b), the total sum Q(s, u) is calculated by scanning the memory 8 while changing the value of s in L (s+i, u+j) from O to (k−m) as well as the value u from O to (l−n) so as to obtain a scanning position (ps, qu) which minimizes the total sum Q(s, u). Based on the thus obtained scanning position (ps, qu) minimizing the total sum Q(s, u), a provisional window 16 is set. In this regard, however, since such a determination is made without discriminating between the image signals of the object 5 and those of the background, there is a fear that the relative position of the image of the object 5 with respect to the window 13 differs from that with respect to the provisional window 16. Accordingly, if the above operations are repeated to perform image following while making the provisional window as a new reference image window 13, the image of the object 5 could come out of the new window 13 with the result that it becomes impossible to follow the image of the object 5. In order to avoid this situation, in the conventional apparatus, the configuration of the window 13 is made as similar to that of the object 5 as possible so as to eliminate the influences from the background images. According to the present invention, however, taking account of the fact that the object 5 in the form of an automobile is generally symmetrical with its vertical center line, in Step 1012, the provisional window 16 is modified in such a manner that the window 13 is set in a position in which the images inside the window 13 become most symmetrical with respect to the vertical center line of the window 13 so as to always place the image of the object 5 in the form of an automobile in the center of the window 13. To this modification, for example, by shifting the provisional window 16 little by little (e.g., one picture element by one picture element), a total sum of difference T(Δs) for the images in the provisional window 16 is calculated using the following formula:

$$T(\Delta s) = \sum_{i=1}^{m/2} \sum_{j=1}^{n} |L(ps + \Delta s + i, qu + j) - \quad (3)$$

$$L(ps + n + \Delta s - i, qu + j)|$$

Figure 4C:
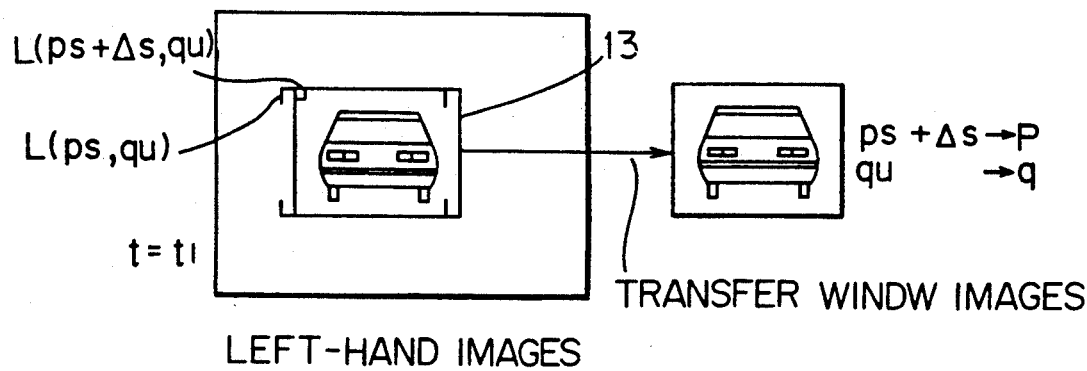
FIG. 4(c) is an explanatory view showing that the provisional window is modified to provide the most symmetrical window containing the left-hand image of the object, which is transferred into the memory.

Here, scanning a predetermined range for Δs, the total sum of difference T(Δs) is successively calculated so as to determine an appropriate position for Δs, which gives a minimum value of T(Δs). As shown in FIG. 4(c), a new window 13 having a size of m×n is set with its upper left corner being positioned at a location (ps+Δs, qu).

If in Step 1013, the driver sets off or erases the window 13, the program returns to Step 1003 and no distance calculations and no image following operations are performed until the driver again sets up a new window 13. If, however, the window 13 is not erased or set off by the driver, the program returns to Step 1006 and the above-described operations are repeated. In this manner, the distance to the object 5, which is designated by the driver, can successively be measured using the window 13, while at the same time, the driver can ascertain the manner of image following through the screen of the display 11.

Figure 5:
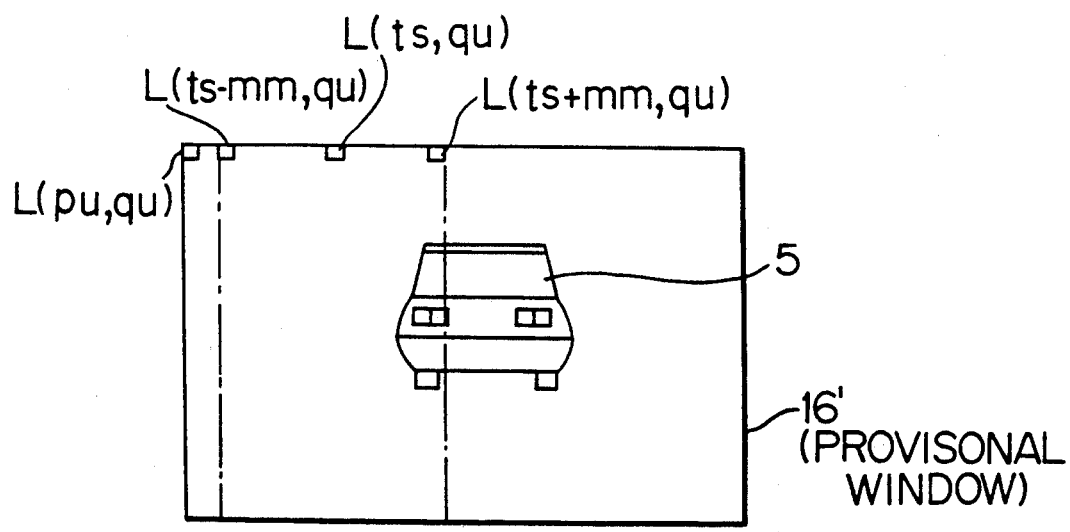
FIG. 5 is an explanatory view showing how to find the axis of symmetry of a target image of an object in the form of a vehicle in a provisional window in accordance with a second embodiment of the invention.
Figure 6A:
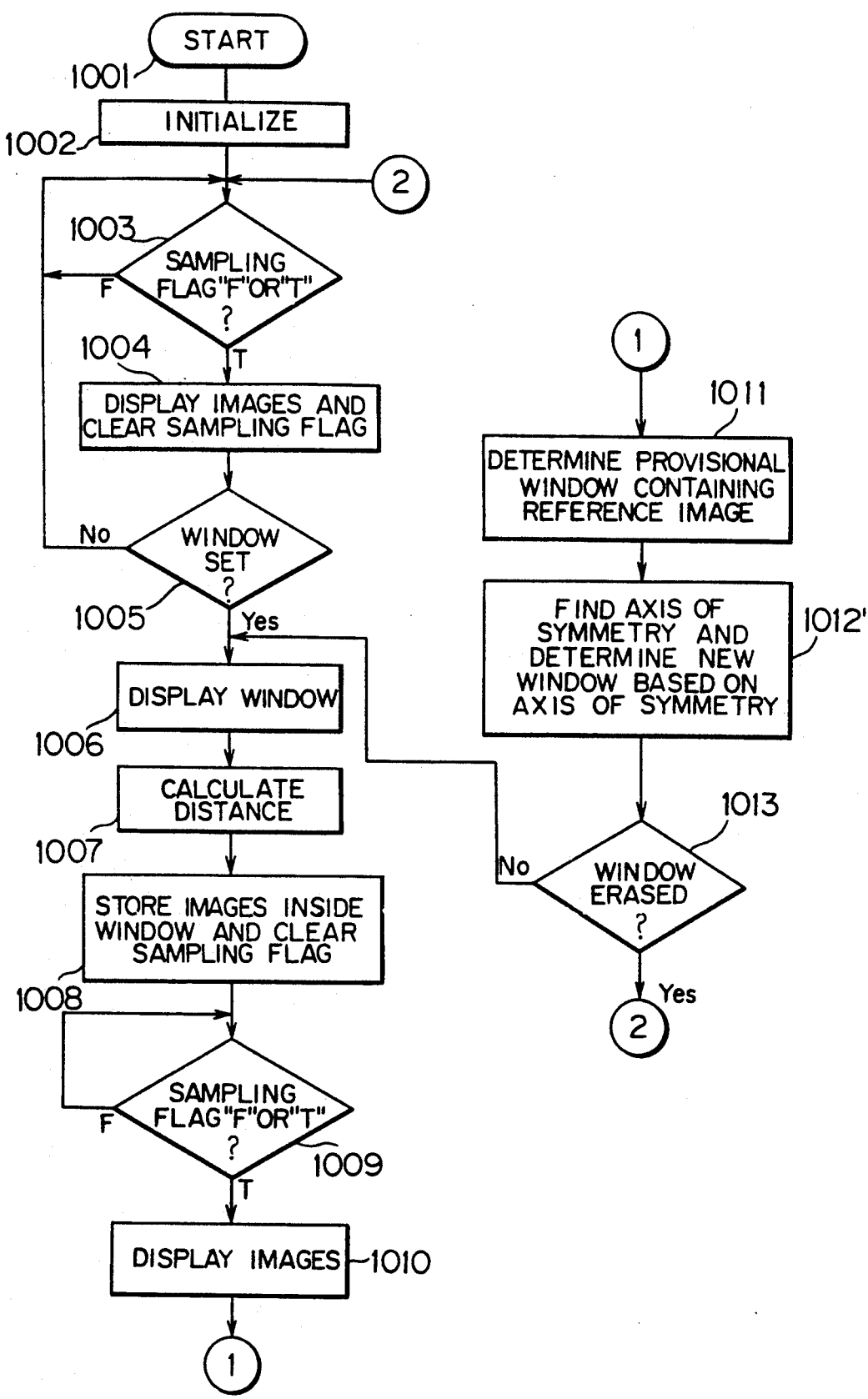
FIGS. 6(a) and 6(b) are flow charts similar to FIGS. 3(a) and 3(b), but showing the operation of the apparatus of FIG. 1 in accordance with the second embodiment.
Figure 6B:
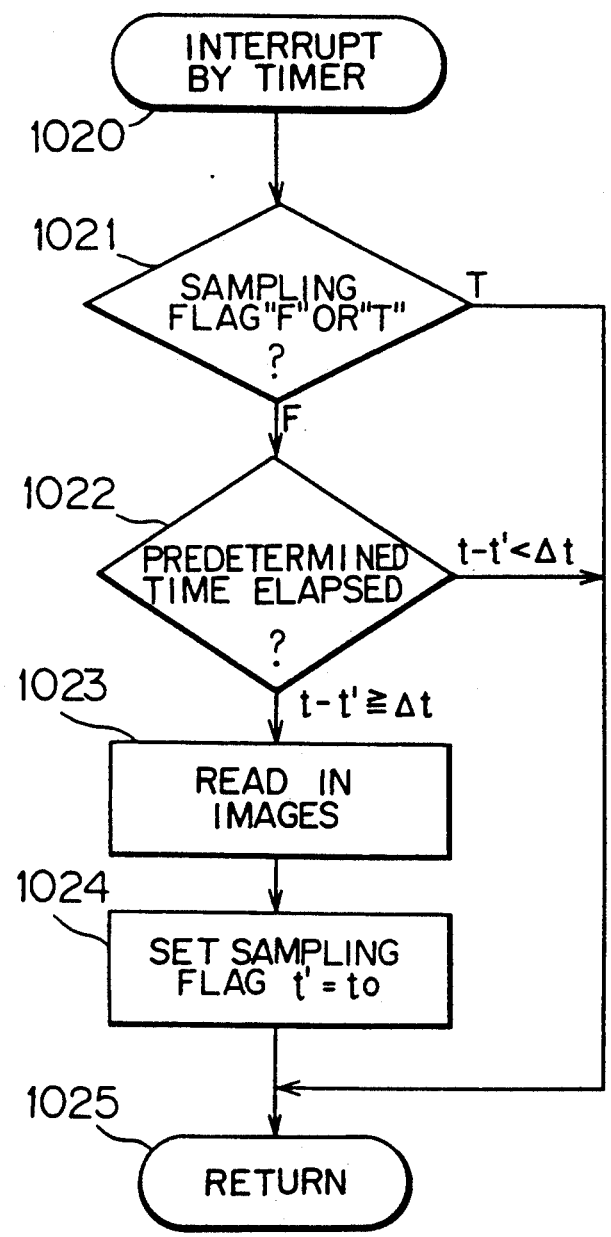
Figure 7:
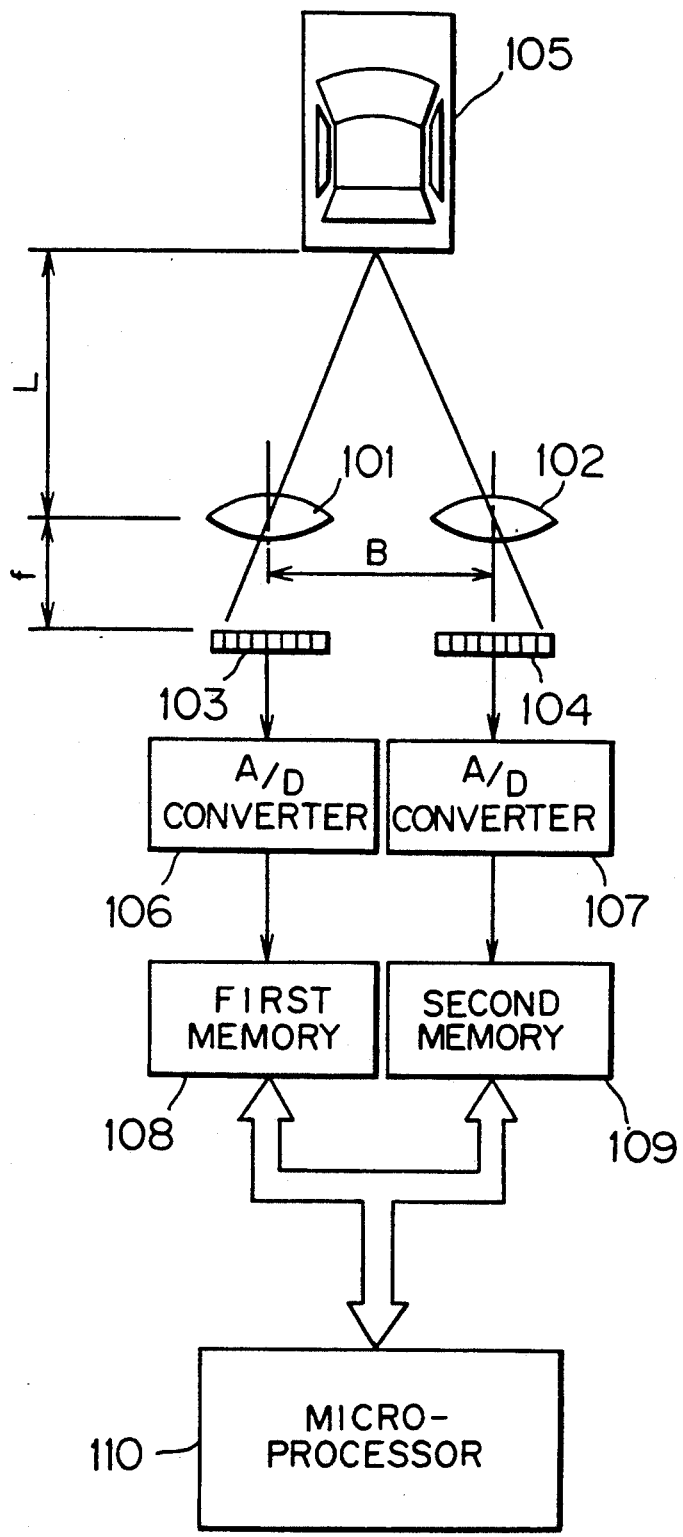
FIG. 7 is a view similar to FIG. 1, but showing a known distance detecting apparatus for a vehicle.

Next, another embodiment of the invention will be described while referring to FIGS. 6(a) and 6(b). In this embodiment, the construction of the apparatus, and the manner of detecting the distance to a preceding vehicle, defining the image of an object 5 by the driver using a window 13, and setting up a provisional window based on the image of the object 5 defined by the window 13, are substantially the same as in the first-mentioned embodiment, but there is a difference in the manner of setting up a new window on the basis of a provisional window. That is, the microprocessor of this embodiment includes, instead of the symmetry evaluating means and the reference image setting means of the previous embodiment, a symmetry axis determining means for determining the axis of symmetry of image signals within the provisional window, and a reference image setting means for setting, as reference image signals, a new window having a prescribed center line positioned at the location of the axis of symmetry of image signals therein. Specifically, as shown in the flow chart of FIG. 6(a), this embodiment differs from the previous embodiment of FIGS. 3(a) and 3(b) in Step 1012' alone. Specifically, in this embodiment, the axis of symmetry in the provisional window is detected based solely on the image signals in the window without scanning it, and then on the basis of the thus detected axis of symmetry, a new window is set. In this connection, for example, as illustrated in FIG. 5, assuming that in a provisional window 16' with its upper left corner being positioned at a location (pu, qu), the position of a provisional axis of symmetry is represented by ts, a total sum of the difference T(ts) between the value (i.e., 0 or 1) of a picture element L(ts−i, qu+j) and that of another picture element L(ts+i, qu+j) is calculated using the following formula:

$$T(ts) = \sum_{i=0}^{mm} \sum_{j=0}^{n} |L(ts - i, qu + j) - L(ts + i, qu + j)| \quad (4)$$

where mm is a value less than m. By successively changing the provisional axis of symmetry ts in a range from a location (pu+mm) to a location (pu+m−mm), the total sum of the difference T(ts) is calculated so as to determine a value of ts which minimizes T(ts). Based on the thus determined value of ts, a new window having a size of m×n is set with its upper left corner being positioned at a location (ts−m/2, qu). That is, the new window is set with the axis of symmetry thereof being made as its vertical center line. The remaining processes of FIG. 6(a) before and after Step 1012' are the same as those in FIG. 3(a). In addition, the timer interrupted routine of FIG. 6(b) is the same as that of FIG. 3(b).

Although in the above embodiments, all the image signals in the window 13 are used to perform image following, some of them may be omitted as necessary. For example, taking equation (2) above, a provisional window can be set using the following formula:

$$Q(s, u) = \sum_{i=1}^{m} \sum_{j=1}^{n} |W(i, j) - L(s + i, u + j)|$$

Likewise, in the calculation for evaluating the symmetry of the object 5, similar modification or simplification may be made. In addition, although in the above embodiments, one pair of right and left optical systems 1, 2 are disposed in a horizontally spaced relation, they may be disposed in a different manner. For example, they can be disposed in a vertically spaced relation or in an obliquely or diagonally spaced relation, while providing substantially the same results. Moreover, although one pair of separate image sensors 3, 4 are employed, a single image sensor can be utilized which has an image-sensing area divided into two for the respective optical systems.

As described in the foregoing, according to the present invention, a window is set up in the images displayed on a screen of a display, and the images within the window are successively stored in a memory so that one image within the window at a time, which is similar to the last stored image, is searched for. A provisional window containing the thus searched similar image is formed and then shifted little by little so as to find a proper position of the provisional window at which the best symmetry of the image within the window is obtained. The most symmetrical window thus found is stored in a memory as a new window. In this manner, the distance detecting apparatus of the invention can identify in a reliable manner a preceding vehicle, which is generally symmetrical with respect to its vertical center line, and successively measure the distance to the target preceding vehicle in a highly accurate manner.

What is claimed is:

1. A distance detecting apparatus for a vehicle comprising:
    a pair of optical systems including image-sensing means for imaging an object at two different points and generating first and second image signals representative of the object;
    window forming means for forming a specific window for one of the first and second image signals on a screen of a display;
    distance measuring means for making a comparison between the first and second image signals in the specific window so as to measure the distance from the optical systems to the object;
    provisional window setting means for successively sampling image signals at a predetermined time interval, making a comparison between the sampled image signals in the specific window at two successive points in time, detecting the most similar of the sampled image signals between the two time points, and setting up a provisional window based on the most similar sampled image signals;
    symmetry evaluating means for evaluating the symmetry of said image signals within the provisional window, said symmetry evaluating means being operable to shift the provisional window little by little so as to find the best position thereof which provides the best symmetry of the image signals therein; and
    reference image setting means for setting, as reference image signals, a new window at the best position of the provisional window.

2. A distance detecting apparatus according to claim 1, further comprising means for calculating the direction and quantity of movement of the object on the basis of a change between two successively set reference image signals.

3. A distance detecting apparatus for a vehicle comprising:

a pair of optical systems including image-sensing means for imaging an object at two different points and generating first and second image signals representative of the object;

window forming means for forming a specific window for one of the first and second image signals on a screen of a display;

distance measuring means for making a comparison between the first and second image signals in the specific window so as to measure the distance from said optical systems to the object;

provisional window setting means for successively sampling image signals at a predetermined time interval, making a comparison between the sampled image signals in the specific window at two successive points in time, detecting the most similar of the sampled image signals between the two time points, and setting up a provisional window based on the most similar sampled image signals;

symmetry axis determining means for determining the axis of symmetry of said image signals within the provisional window; and reference image setting means for setting, as reference image signals, a new window having a prescribed center line positioned at the location of the axis of symmetry of image signals therein.

4. A distance detecting apparatus according to claim 3, further comprising means for calculating the direction and quantity of movement of the object on the basis of a change between two successively set reference image signals.

5. A method for detecting the distance to an object comprising the steps of:

imaging an object at two different points to generate first and second image signals representative of the object;

forming a specific window for one of the first and second image signals on a screen of a display;

making a comparison between the first and second image signals in the specific window so as to measure the perpendicular distance from the two points to the object;

successively sampling the image signals at a predetermined time interval;

making a comparison between the sampled image signals in the specific window at two successive points in time;

detecting the most similar of the sampled image signals between the two time points;

setting up a provisional window based on the most similar sampled image signals;

shifting the provisional window little by little so as to find the best position thereof which provides the best symmetry of the image signals therein; and setting, as reference image signals, a new window at the best position of the provisional window.

6. A method according to claim 5, further comprising calculating the direction and quantity of movement of the object on the basis of a change between two successively set reference image signals.

7. A method for detecting the distance to an object comprising the steps of:

imaging an object at two different points to generate first and second image signals representative of the object;

forming a specific window for one of the first and second image signals on a screen of a display;

making a comparison between the first and second image signals in the specific window so as to measure the perpendicular distance from the two points to the object;

successively sampling the image signals at a predetermined time interval;

making a comparison between the sampled image signals in the specific window at two successive points in time;

detecting the most similar of the sampled image signals between the two time points;

setting up a provisional window based on the most similar sampled image signals;

determining the axis of symmetry of image signals within the provisional window; and setting, as reference image signals, a new window having a prescribed center line positioned at the location of the axis of symmetry of image signals therein.

8. A distance detecting apparatus according to claim 7, further comprising calculating the direction and quantity of movement of the object on the basis of a change between two successively set reference image signals.

* * * * *